United States Patent [19]

Totten

[11] Patent Number: 5,025,841

[45] Date of Patent: Jun. 25, 1991

[54] MULTI-PURPOSE SUPPORT TABLE FOR A ROUTER

[75] Inventor: John M. Totten, Orlando, Fla.

[73] Assignee: Porta-Nails, Inc., Wilmington, N.C.

[21] Appl. No.: 551,878

[22] Filed: Jul. 12, 1990

[51] Int. Cl.⁵ .......................... B27C 5/02; B25H 1/00
[52] U.S. Cl. .................... 144/134 R; 144/1 R; 144/134 A; 144/137; 144/145 R; 144/82; 144/84; 144/251 A; 144/286 R; 409/110; 409/130; 409/228
[58] Field of Search ............... 144/1 R, 1 F, 134 R, 144/134 A, 137, 145 A, 145 C, 84, 87, 252 R, 252 A, 251 R, 251 A; 409/110, 130, 182, 228, 229

[56] References Cited

U.S. PATENT DOCUMENTS

| | | | |
|---|---|---|---|
| 3,734,151 | 5/1973 | Skripsey | 144/286 R |
| 4,163,465 | 8/1979 | Strong | 144/87 |
| 4,350,193 | 9/1982 | McCambridge et al. | 144/286 R |
| 4,509,572 | 4/1985 | Archer | 144/84 |
| 4,576,213 | 3/1986 | Miller | 144/134 R |
| 4,749,013 | 6/1988 | Ducate, Sr. | 144/137 |
| 4,763,706 | 8/1988 | Rice et al. | 144/84 |
| 4,774,986 | 10/1988 | LaGra | 144/286 R |

Primary Examiner—W. Donald Bray
Attorney, Agent, or Firm—Ralph H. Dougherty

[57] ABSTRACT

A table includes a support member having a work surface with an opening extending through the support member and the work surface. A first mechanism for mounting a router with the support member is provided. A router bit extends generally vertically through the opening and beyond the work surface. A second mechanism for mounting the router with the support member is provided so that the router bit extends generally parallel with the work surface. A mechanism for adjusting the dimension between the router bit and the work surface when the router is mounted with the second mechanism is also provided. The support member has a recess for receiving at least a portion of the router bit below the level of the work surface when the router is mounted with the second mechanism.

17 Claims, 3 Drawing Sheets

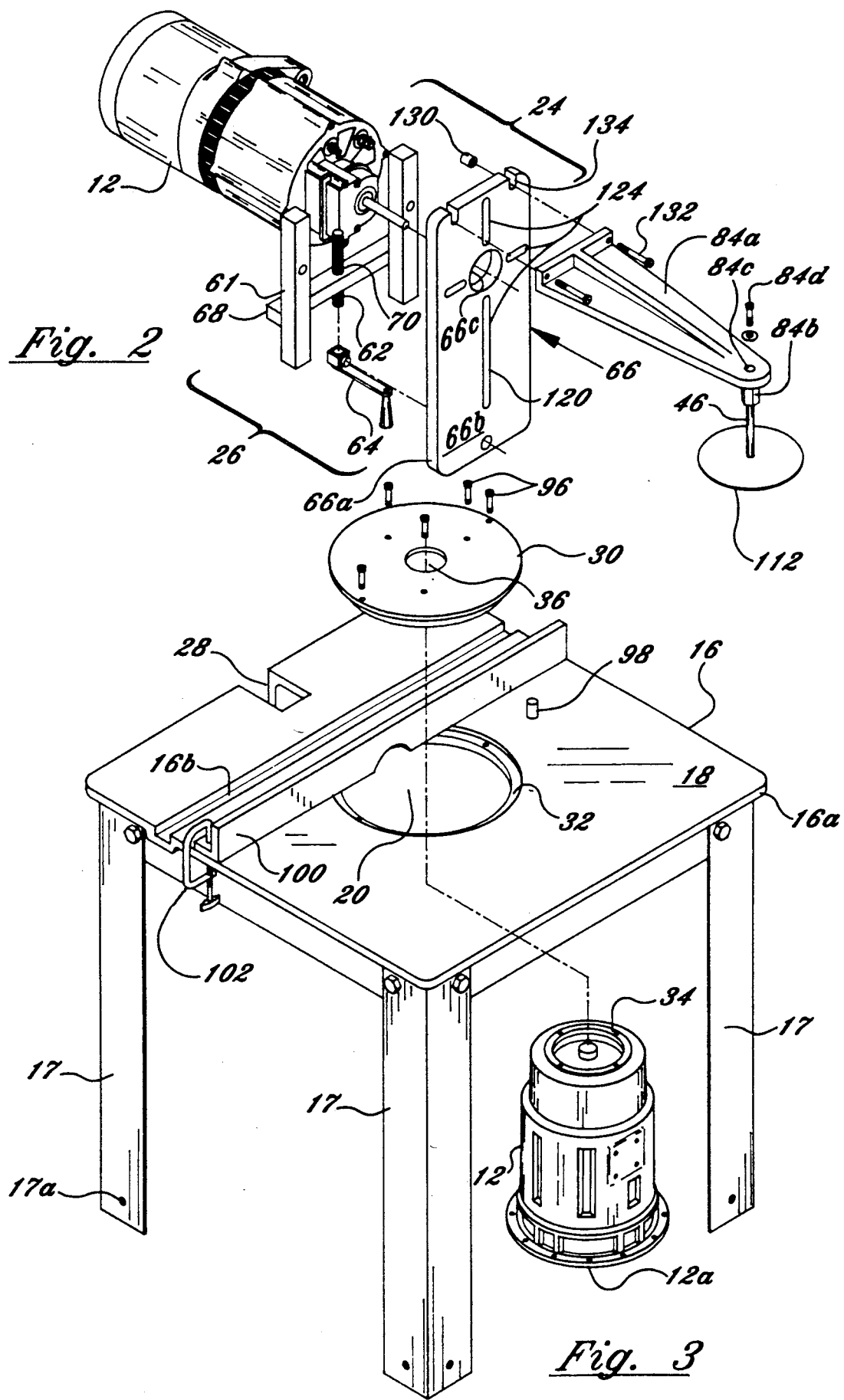

MULTI-PURPOSE SUPPORT TABLE FOR A ROUTER

BACKGROUND OF THE INVENTION

1. Field of the Invention

The present invention relates generally to a woodworking apparatus, and more particularly to an apparatus for cutting various types of joints, shapes, and articles from wooden workpieces.

2. Description of Related Art

A router is a commonly used machine with a rapidly revolving vertical spindle and cutter for milling out the surface of wood. The cutter typically includes a router bit which cuts the radius of a particular workpiece. As with a great many power tools, great care must be taken when using a router in order to maximize safety. Improper or careless use of a router may result in serious injury.

Applicant is aware of U.S. Pat. No. 4,163,465, which issued to Donald Strong on Aug. 7, 1979, for an Apparatus For Cutting Dovetail Joints. Strong relates to means for cutting close-fitting joints in wooden workpieces, and to an apparatus for supporting a router on a support plate for adjustment along a pair of slide bars such that a dovetail cutting tool can be employed for cutting close-fitting dovetail tongue and groove joints.

Strong relates generally to a device that may be used in wood-cutting endeavors but differs both in structure and operation from the present invention. Applicant is unaware of any prior art that accomplishes the objects of the present invention. Consequently, a need exists for a device accomplishing the objects of the present invention.

SUMMARY OF THE INVENTION

The invention provides apparatus for cutting various types of joints, shapes, and articles from wooden workpieces.

A table includes a support member having a work surface with an opening extending through the support member and the work surface. A first means for mounting a router with the support member is provided. A router bit extends generally vertically through the opening and beyond the work surface. A second means for mounting the router with the support member is provided so that the router bit extends generally parallel with the work surface. Means for adjusting the dimension between the router bit and the work surface when the router is mounted with the second means is also provided. The support member has a recess for receiving at least a portion of the router bit below the level of the work surface when the router is mounted with the second means.

OBJECTS OF THE INVENTION

The principal object of the invention is to provide an improved apparatus for cutting various types of joints, shapes, and articles from wooden workpieces, such as sash and door stiles or raised-panels for door or wall applications.

A further object of this invention is to provide an apparatus for utilizing a wide variety of wood-cutting bits.

Another object of the invention is to produce a wood-cutting apparatus which enhances operational safety.

BRIEF DESCRIPTION OF THE DRAWINGS

The foregoing and other objects will become more readily apparent by referring to the following detailed description and the appended drawings in which:

FIG. 2 is an exploded view of the preferred embodiment for mounting a router along a direction parallel to the work surface of the support member, illustrating means for raising or lowering the router and a mechanism for performing pin routing operations.

FIG. 3 is an exploded view of the invention illustrating means for mounting the router with the support member such that the router bit extends generally beyond the plane of the work surface.

DETAILED DESCRIPTION

Figure 1:
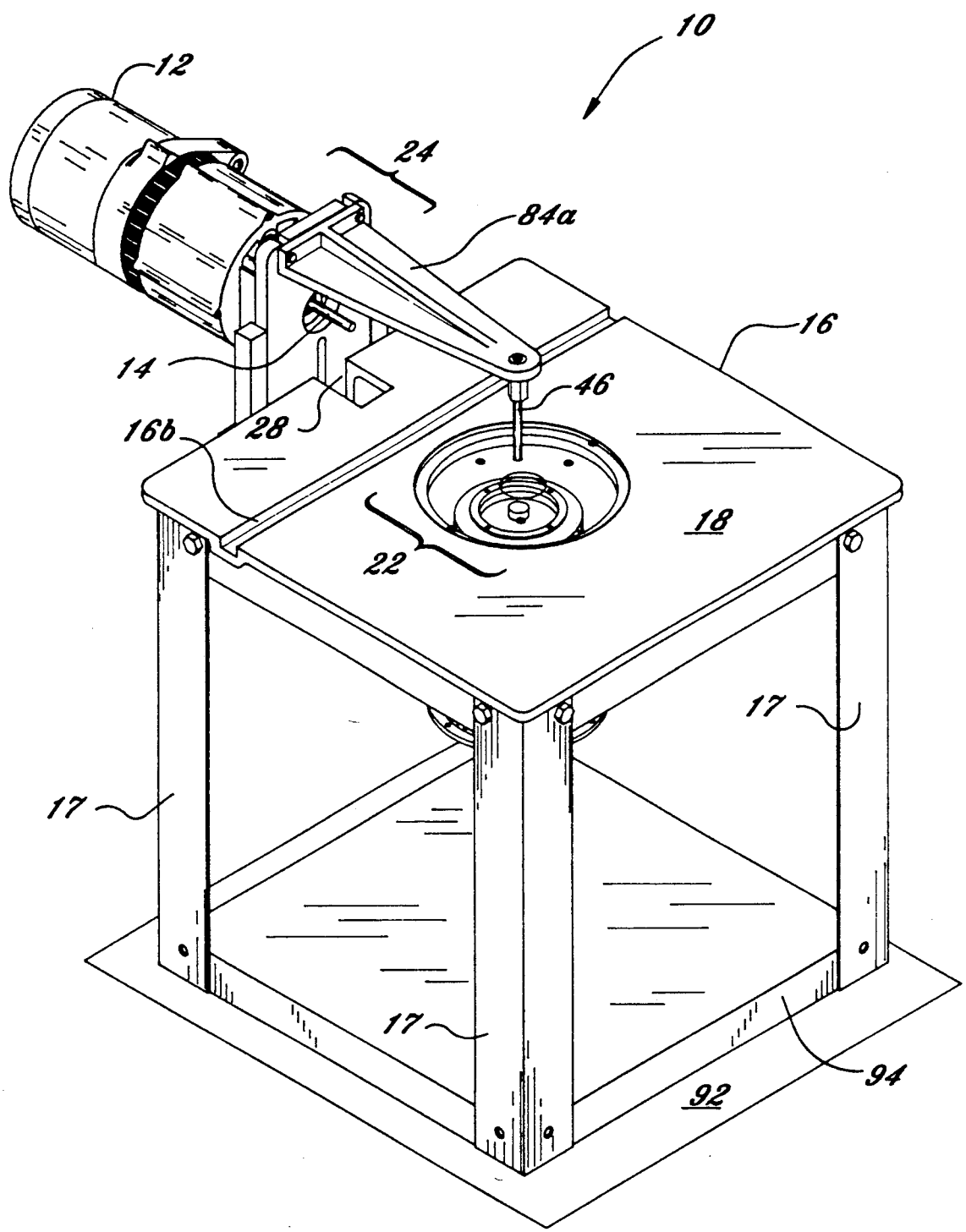
FIG. 1 is a perspective view of the invented multipurpose support table for a router.

Referring now to the drawings, and particularly to FIG. 1, the invented multi-purpose support table 10 includes a router 12 having a router bit 14.

The table 10 includes a workpiece support member 16 having a work surface 18 with an generally central opening 20 extending through the support member 16 and the work surface 18. A first mounting means 22 for mounting the router 12 centrally beneath the support member 16 is provided. The router bit 14 extends generally vertically through the opening 20 and beyond the work surface 18. A second mounting means 24 for mounting the router 12 at one edge of table 10 orients the router bit 14 and extends generally parallel with the work surface 18. Adjusting means 26 for adjusting the spacing dimension between the router bit 14 and the work surface 18 when the router 12 is mounted with the second means 24 is also provided. The support member 16 is provided with has a recess 28 for receiving at least a portion of the router bit 14 below the level of the work surface 18 when the router 12 is mounted with the second means 24. The recess 28 is a preferably about 2" wide and 2" deep opening at the edge of the table 10, which permits the bit 14 to be lowered below the level of surface 18 of the table 10.

Preferably, the support member 16 is a unitary casting, with provisions for four (4) legs 17 to be attached to the four corners of the support member 16. The legs 17 may be of respective sufficient length to support the support member 16 at normal table height, or may be shortened legs 17 adapted for attachment to a workbench 92. For example, the shortened legs 17 may attach to a wooden base 94 affixed to the workbench 92. The table 10 may thereby be easily attached to and removed from the workbench 92.

The first mounting means 22 includes a support plate 30, a recessed ledge 32 for suspending the plate 30 in the opening 20 with the upper surface of plate 30 side generally flush with the work surface 18. The router 12 is attached to the underside of the plate 30 by screws reclined in threaded holes. The support plate 30, which is preferably a polycarbonate disc, has a central aperture 36 for receiving the router bit 14 therethrough, to allow the bit 14 to extend beyond the plane of the work surface 18. The router 12 is attached to the plate 30 with countersunk screws. The router 12 is positioned through the opening 20, and the plate 30 mates with the support member 16. Countersunk screws 96 secure plate 30 and router, if attached, to the support member 16.

The plate 30 can be modified to mount various bushings which are used for inlay routing.

A safety pivot peg or pin 98 may be attached to the top of the support member 16. Peg 98 acts as a pivot for a workpiece to safely permit the operator to slowly and controllably feed a workpiece into a router bit 14, which router bit advantageously has a bearing mounted thereon for controlling the depth of a cut. The pin 98 is threaded on one end and the support member 16 is tapped to receive it. The pin 98 maybe screwed into the bottom of the tapped hole for storage when not in use.

A fence 100, advantageously a 3"×3" angle of a length equal to the length of the support member 16, is attached at each end by means of a clamp 102, or alternatively a socket head screw. The fence 100 facilitates accurate determination of the depth of cut into a workpiece by the router bit 14. The router bit 14 is attached to the router 12 and positioned so that its greatest diameter is perpendicular to the fence 100. One end of can be pivotally attached to support 16, and the fence rotated about the fence 100 from its pivot end to contact the router bits to and form a tangent to the circle defined by the diameter of the router bit 14. A scale can be provided on the edge of the table 10 opposite the pivot end of fence to determine the desired depth of cut. The fence 100 is located on a mark and locked in place, thereby setting the depth of cut at the router bit 14, relative to the workpiece intended to be machined.

An alternative fence may be utilized which provides for the collection of wood shavings during operation of the router 12. The fence is attached to a vacuum and operated during the cutting to collect the shavings. The fence is attached to the support member 16 with two screws tapped into the top surface of the support member 16.

The two ends of the support member 16 each have a lip 16a overhanging the end which permits attachment of any fence-like attachment to the support member 16 with simple clamps. A variety of incremental stops can be attached to the surface of the support member 16.

The top of the support member 16 has a slot 16b machined in its surface. The slot 16b is adapted for holding a miter slide which is a device for sliding a workpiece along the support member 16 in a controlled way and for feeding the workpiece into router bit 14 to machine a desired shape. The fence 100 can be adjusted to obtain any angle up to about 45 degrees left or right of the machined slot 16b. The miter slide will move the workpiece into the bit 14 in either the horizontal or the vertical operational mode.

Figure 4:
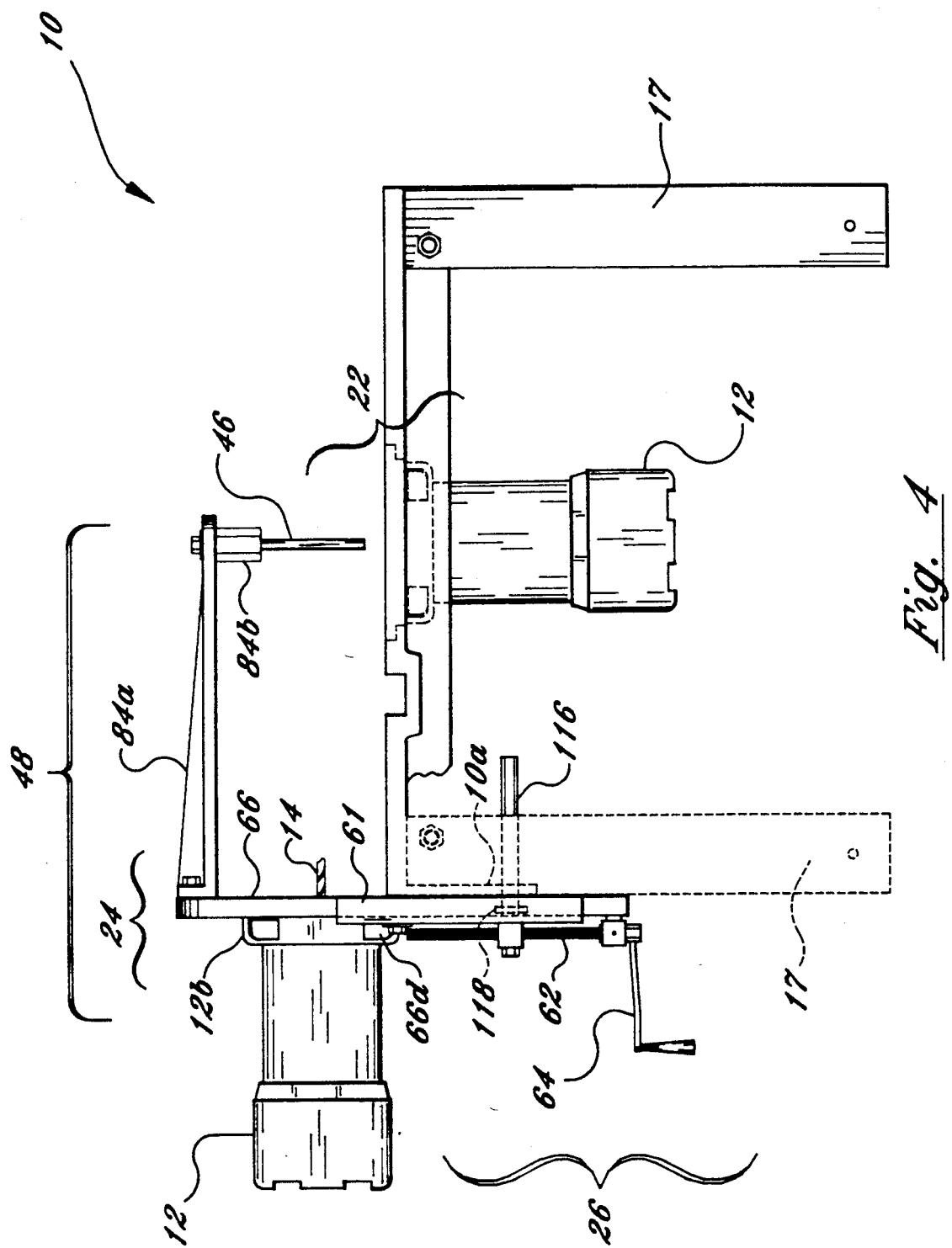
FIG. 4 is an elevated view of the invented multi-purpose support table for a router.

The second mounting means 24 includes means for holding the router 12 alongside the support member 16 with the cutting tool extending generally parallel across the work surface 18, and means 26 below the level of the work surface 18 for raising and lowering the holding means together with the router 12 relative to the work surface 18. Preferably, the dimension-adjusting means 26 includes a threaded shaft 62 and crank 64, each rotation of the crank 64 representing a preselected change of the dimension between the router bit 14 and the work surface 18. The holding means includes a mounting plate 66 having outside and inside surfaces 66a, 66b with a hole 66c extending laterally between the outside and inside surfaces 66a, 66b and dimensioned to receive the router bit 14 and attaching means, such as screws for releasably supporting the router 12 along the outside surface of plate 66 with the router bit 14 extending through the hole 66c and generally parallel with the work surface 18. The raising and lowering means 26 includes a brace member 68 fixed with the support below and generally parallel with the work surface 18. The brace member 68 has a threaded aperture 70 for receiving the threaded shaft 62 generally vertically, with the upper end of the threaded shaft 62 bearing against the holding means for effectuating the desired raising and lowering of the mounting plate 66 together with the router 12. The upper end of threaded shaft 62 preferably engages a projection 66d on mounting plate 66, by which mounting plate 66 is raised and lowered. Alternatively, the upper end of threaded shaft 62 can bear against the case of router 12, or, more advantageously, is connected to a removable collar 12b about the end of the router, as shown in FIG. 4. The second mounting means 24 permits the router bit 14 to be raised or lowered, relative to the base, and permit the cutting of evenly spaced fingers or shapes to make fine fitting joints in the wooden workpiece.

A longitudinal back table support member 10a extends downwardly farther then the other table support members, preferably about 7 inches. This extended support 10a permits mounting of the mounting plate 66 thereon. The extended support 10a is machined flat for mating with the mounting plate 66. The mounting plate 66 is aligned and positioned between two alignment strips 61 made of ultra high molecular weight urethane which are fixed vertically onto the extended support 10a. This urethane material has a very "slick" surface and is extremely wear resistant. The strips 61 preferably have an L-shaped cross section for positively retaining plate 66 between them. The mounting plate 66 is clamped tight to the router table 10 with a locking handle 116 located under the table 10. The locking handle 116 must be locked and unlocked after every movement of the mounting plate 66 in order to permit movement. The locking handle 116 is threaded to a T-nut 118 which fits into a slot 120 in the length of the mounting plate 66. Each full turn of the crank 64 will raise or lower the router bit 14 a predetermined distance, preferably exactly 1/16". The range of adjustment in the mounting plate 66 is advantageously from minus 1" to plus 6" (below and above the table 10).

The router 12 is mounted at the top of the mounting plate 66 with its centerline aligned with the center of opening 66c in the plate 66. The inside surface 66b of the mounting plate 66 has a slot pattern 124 which permits various router designs and sizes to be mounted with ease. The slot pattern 124 cast into the plate 66 provides a countersink for the screws which attach the router 12 to the plate 66. When initially mounting the router 12, the router 12 is centered, drill points are marked, holes are aligned in the center of the appropriate slots for the shank size of the screw, and the router 12 attached. The screws are countersunk and thus offer an unobstructed smooth face to the workpiece. The face of the mounting plate 66 is perpendicular to the router table 10, and the router bit 14 is horizontal or parallel to the router table 10. The router bit 14 extends outward into the router table 10 in a horizontal mode, contrary to the vertical mode when the router 12 is mounted beneath in the router table 10.

The table 10 may also have a rod 46 and means 48 for suspending the rod 46 over and generally concentric with the opening 20 and the router bit 14 when the router 12 is mounted with the first mounting means 22, so that the rod 46 may function as a pattern pin for pin routing operations. A safety shield 112 and means, such as a friction connector or a screw, for removably mounting the safety shield 112 on the free end of the rod 46 toward the work surface 18 may also be provided. The safety shield mounting means allows suspending of the safety shield 112 a distance from the work surface 18 and in alignment with the center of the opening 20 and the router bit 14, so that work moved across the work surface 18 is passed under the safety shield 112 and into contact with the bit 14 supported in the opening 20. The safety shield 112 may be clear plastic, polycarbonate, polyurethane, or the like. An overarm 84a, which extends out over the support member 16, has an attachment 84b which plugs into the tool socket 84c on the end of the overarm 84a. The overarm 84a is removably mounted on the mounting plate 66. A rod 46 is centered over the router bit 14. Attached on the end of the rod 46 is preferably a disc or safety shield 112 of polycarbonate material of ¼" thickness. The disc 112 is positioned to provide sufficient space for the workpiece to pass beneath. The overarm 84a is attached to the mounting plate 66, which is locked to the support member 16. The threaded shaft 62, which drives the mounting plate 66 up or down, then raises or lowers the safety shield 112 to the desired height above the router bit 14. The safety pivot pin 98 is used in combination with the safety shield 112. The safety shield 112 is spaced from the work surface 18 so that work moving across the surface 18 is passed under the safety shield 112 and into contact with the router bit 14. Thus, the table 10 permits the facile support of the router 12 either with the bit 14 parallel with the work surface 18 for joint making activities, or with the router bit 14 normal to the work surface 18 for routing activities, and with the rod 46 providing a pin routing capability.

Inverted pin routing is facilitated by mounting the router 12 vertically in the table 10, and providing for an overarm 84a to extend over the router bit 14. Rod 46 can be any desired diameter. Rod 46 aligns precisely with the router bit 14. A pattern is placed over or fixed to the workpiece and the rod 46 engages the pattern and the shape is duplicated in the underside of the workpiece. The pattern controls the shape of what is cut below. The pin may be raised or lowered depending on the height of the workpiece and the pattern.

The overarm 84a is demountably attached to the top of the mounting plate 66, and extends over the table 10 beyond the location of the bit 14. At the end of the overarm 84a is a tool socket 84c which receives rods of various diameters. The tool socket 84c is aligned with the router 12 by mounting a ¼" or ½" rod into the collet on the router 12 where the bit 14 would normally be mounted. Such rod extends upwardly and the socket 84c is lowered down onto the rod. The locking handle 116 and threaded shaft 62 on the mounting plate 66 facilitate this movement. At the point where the tool socket 84c mates with the overarm 84a, the socket 84c is capable of moving in a range of about ½" horizontally. A screw which is a smaller diameter than socket 84c, and carries one or more washers provides for accurate alignment of rods 46 over the router bit 14. Once aligned, the rod diameter is selected to match the diameter of the bit 14.

The pattern, usually made from plastic or masonite, is attached to the top of the workpiece. The pattern is typically smaller than the workpiece. The pin height is adjusted so that it clears the workpiece and makes good contact with the pattern. The locking handle 116 is tightened, and inverted pin routing may proceed. When routing patterns into the face of a workpiece, an air cylinder may be used in place of the rod 46. The air cylinder permits upward and downward control of the rod 46 with a foot controlled air switch 140, thus keeping both hands free to control the movements of the workpiece/pattern under the rod 46. The pin 46 is driven down with compressed air, activated by the foot switch, and raised by spring action built into the air cylinder. The preferred method of attaching the pattern to the workpiece is by means of a vacuum chuck. This can be accomplished either by inserting a vacuum chuck between the pattern and the workpiece or by making a vacuum chuck out of the pattern. The vacuum chuck is a flat plate with intersecting holes. On both sides of the plate there is placed an unbroken line of closed cell foam tape which forms a gasket. Vacuum is drawn from the side of the chuck, and draws both pattern and workpiece to it. Thus, the pattern, vacuum chuck, and workpiece, are stacked. Alternatively, the pattern can be made thicker and drilled with the same intersecting holes and gasket material applied to one side.

In operation, the legs 17 are mounted to the table 10 with screws on bolts. The table legs 17 are mounted to a wooden base 94, preferably made of a sheet of ¾" plywood approximately 24"×24". The base of the table legs 17 have holes 17a drilled for the easy attachment of the wooden base 94. The wooden base 94 provides for quick and easy assembly and removal of the table 10, and also counteracts the weight of the router 12 when installed on the mounting plate 66.

The plastic base 12a (also called sub-base) to the router 12 may be removed and used as a template to mark the hole pattern of the router 12 to the support plate 30. The location of the holes and drill holes are marked to permit a "slip fit" of the screws 96 through the plate 30. The plastic base 12a is centered in the hole 36 in the center of the support plate 30. The screw holes are countersunk on the top of the plate 30. The router 12 is mounted to the support plate 30 with screws. The threaded holes in the cast aluminum top preferably have Helicoil inserts of stainless steel which provides a permanent thread in the softer aluminum.

The support plate 30 is preferably is ⅜" thick. The circular counterbore 32 in the table top which holds the support plate 30, is slightly deeper by a few thousandths of an inch. After the router 12 is mounted to the support plate 30, the support plate 30 is lowered into the counterbore 32, and the two screw holes aligned with the holes in the support plate 30. The top of the support plate 30 will be slightly lower than the table top.

A workpiece is fed to the router 12 from the right to the left, when using the router 12 mounted in the table opening 20. Initially, as the workpiece is fed right-to-left, the workpiece will rub and bump against the table 10 at the left side of the opening 20. To remedy this, the screws 96 on both sides of the support plate 30 are loosened, the left side of the support plate 30 is lifted slightly and a paper shim is inserted. The screws 96 are then tightened thereby allowing a workpiece to be fed without obstruction or "bump" when fed right-to-left. If fed left-to-right, there will be an obstruction or bump on both the left and right side of the support plate 30. No attempt should be made to overcome this safety feature.

The mounting plate 66 is pre-assembled, with the threaded shaft 62 and crank 64 attached, and a T-nut 118 in the slot 120 of the mounting plate 66. The brace member 68 is preferably threaded approximately halfway onto the threaded shaft 62. The plate 66 is attached to the table 10 passing the T-nut 118 into the locking handle 116, through the casting in the center hole, through the ⅜" flat washer, and the thread on the locking handle 116. The mounting plate 66 is squared to the router table 10 using the table top as a horizontal reference and locked in position with the locking handle 116.

Two alignment plates, one on each side of the mounting plate 66, are attached to the extended support 10a using bolts or screws. The holes in the plates 61 are slightly oversized to permit full contact of the edge of the alignment plates 61 to the edge of the mounting plate 66. The slick surface of the alignment plates permit an easy passage of the mounting plate 66, both up and down, and has a "wear" resistance five times that of stainless steel.

In order to mount a router 12 on the mounting plate 66, a slot pattern 124 is selected that fits the router 12. The slot pattern 124 provides a countersink for the screw holes to be drilled. The plastic base 12a from the router 12 may be used to define slots for routers requiring a different pattern. The hole on the front side of the plate 66 is countersunk. The router collet is centered in the 2" diameter hole 66c of the mounting plate 66 through which the router bit 14 will pass.

Locking knobs 130 are advantageously used to attach the two studs or bolts 132 on the overarm 84a. The two studs are positioned in the slots 134 on top of the mounting plate 66 and locked with knobs 130, attaching the overarm 84a. The oversize hole 84c in the end of the overarm 84a permits perfect alignment of the rod 46 and the router bit 14 centerline. The end of the rod 46 has a tapped hole for receiving a screw, which is used to install the safety shield 112.

On the top of the table 10 two holes are tapped #10-32 for attachment to the support plate 30. The two holes tapped ⅜-16 are to attach the optional dust collector fence and the fifth hole is for mounting the safety pivot pin 98. The safety pivot pin 98 is installed in the router table 10 by screwing a ⅜" diameter pin into the tapped hole near to the right of the support plate 30.

In order to perform joint making, the bit 14 is initially raised in recess 28 so the top edge is even with the top of the table 10. A straight edge is laid on the top of the bit 14. The bit 14 is lowered until the straight edge is flush with the table 10. The location of the crank 64 is the "starting point". One full turn will raise or lower the bit 1/16".

When special panel raising bits or face molding bits are used, the bit 14 is lowered by turning the threaded shaft 62 so the top edge of the bit 14 just touches a straight edge placed over the bit 14 and aligned along and touching the top of the table 10. The depth of cut may then be varied as desired for safety reasons, or for obtaining different shapes or effects on the workpiece.

To cut evenly spaced elements of a joint such as a box or finger joint, the router bit 14 is positioned in recess 28 so its top edge is just below the edge of the table 10. The threaded shaft 62 is then turned to raise the bit 14 to the desired height. Example: To cut the first slot when using a 5/16" bit 14, the threaded shaft 62 is turned ten times, a cut performed, the shaft turned ten more times and another cut performed, and so on. The mating piece will have the bit 14 raised five turns, a cut performed, then 10 turns, and so on. Before each movement the locking handle 116 is released, and then locked when in the desired location. Box or finger joints, mortise and tenon joints, through dovetail, dado box corner, and dado joints are some of the types of joints that can be made with the invention.

When using a straight spiral bit, raise the bit to expose 1/16" above the table. Attach a 1/16" thick piece of plastic laminate to the table with double-back tape. This is affixed to the outfeed side (right side) of the bit, and placed next to and along the face of the mounting plate 66. Since the depth of cut matches the height of the laminate, the narrow edge of a workpiece can be finished in exactly the way a joiner operates normally.

The mounting plate 66 orients puts the router bit 14 horizontal to the table 10 and permits raising or lowering the bit 14 in precise increments. The bit 14 can be will lowered about 1" below the table and raise about 5" above the table 10. Most box or finger joint making done with a 5/16 or ⅜" diameter spiral upcut straight bit. One complete turn of the crank 64 moves the router bit 1/16", a half turn 1/32", etc. In the horizontal mode, the term "height of cut" means the height controlled with the crank 64. "Depth of Cut" means the depth of the router bit 14 left or right as controlled by the router 12 mechanism.

Inverted pin routing is facilitated by positioning the router 12 under the table 10 and the rod 46 on top. Three rod diameters are commonly available: ¼, ⅜, and ½". Preferably, a bit 14 is chosen which matches the rod diameter. The rod base is installed and aligned as described above. The rod pin 46 is then installed and lowered to engage the pattern.

SUMMARY OF THE ACHIEVEMENT OF THE OBJECTS OF THE INVENTION

From the foregoing, it is readily apparent that I have invented an improved apparatus for cutting various types of joints, shapes, and articles from wooden workpieces, such as sash and door stiles or raised-panels for door or wall applications, utilizing a wide variety of wood-cutting bits, which enhances operational safety, faster and more economically than heretofore has been possible.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A multi-purpose support table for a router having a router bit, comprising:
   a support member having a work surface with an opening extending through the support member and the work surface;
   first means for mounting the router with the support member so that the router bit extends generally vertically through the opening and beyond the work surface;
   second means for mounting the router with the support member so that the router bit extends generally parallel with the work surface; and
   means for adjusting the dimension between the router bit and the work surface when the router is mounted with the second means.

2. The multi-purpose support table recited in claim further comprising a recess in the support member for receiving at least a portion of the router bit below the level of the work surface when the router is mounted with the second means.

3. The multi-purpose support table recited in claim 1 further comprising:
   a rod; and
   means for suspending the rod over and generally concentric with the opening and the router bit when the router is mounted with the first means, so that the rod may function as a pattern pin for pin routing operations when the router is mounted with the first means.

4. The multi-purpose support table recited in claim 3 further comprising:
   a safety shield;
   means for removably mounting the safety shield on an end of the rod toward the work surface; and wherein
   the safety shield is spaced from the work surface so that work moving across the surface is passed under the safety shield and into contact with the router bit.

5. The multi-purpose support table recited in claim 3 further comprising means for supporting the rod with the dimension-adjusting means, so that the dimension between the rod and the work surface may also be adjusted.

6. The multi-purpose support table recited in claim 1 wherein the second means and the dimension-adjusting means comprise:
   a mounting plate having a hole therethrough dimensioned to receive the router bit;
   means for movably supporting the mounting plate alongside the support table in a vertical position generally perpendicular to the plane of the work surface; and
   means for moving the mounting plate vertically.

7. The multi-purpose support table recited in claim 1 wherein the first mounting means comprises:
   a support plate; having an upper planar surface and a bottom planar surface means for suspending the plate in the opening with said upper surface generally flush with the work surface;
   means for attaching the router to a said bottom surface; and wherein
   the support plate has an aperture for receiving the router bit therethrough, so that the bit extends generally beyond the plane of the work surface.

8. A support for a router having a router bit, comprising:
   a support member having a work surface;
   means for holding the router alongside the support member with the cutting tool extending generally parallel across the work surface;
   means below the level of the work surface for raising and lowering the holding means together with the router relative to the work surface; and
   means for providing an incremental movement of the raising and lowering means relative to the dimension between the router bit and the work surface, comprising a threaded shaft and crank, each rotation of the crank representing a preselected change of the dimension between the router bit and the work surface.

9. The support recited in claim 8 wherein the holding means comprises:
   a mounting plate having outside and inside surfaces with a hole extending between the outside and inside surfaces and dimensioned to receive the router bit; and
   means for releasably supporting the router along the outside surface with the router bit extending through the hole and generally parallel with the work surface.

10. The support recited in claim 9 wherein the raising and lowering means comprises:
    a brace member fixed with the support below and generally parallel with the work surface, the brace member having a vertically threaded aperture for receiving the threaded shaft generally vertically, with the upper end of the threaded shaft bearing against the holding means for effectuating the desired raising and lowering of the mounting plate together with the router.

11. A multi-purpose support for a router having a router bit mounted therein, comprising:
    a support member having a work surface with a vertical opening extending through the support member and the work surface, the opening having a sufficient dimension to permit the router to pass therethrough;
    means for supporting the router with the support member so that the router bit extends through the opening and vertically beyond the plane of the work surface;
    a safety shield; and
    means connected to the support member for suspending the safety shield a spaced distance from the work surface and in alignment with the center of the opening and the router bit, so that work moved across the work surface is passed under the safety shield and into contact with the bit supported in the opening.

12. The multi-purpose support recited in claim 1 wherein the supporting means comprises:
    a support plate having front and backsides;
    means for suspending the support plate in the opening with the front side generally flush with the work surface;
    means for attaching the router to the backside of the plate; and wherein
    the mounting support has an aperture for receiving the router bit therethrough.

13. The multi-purpose support recited in claim 11 wherein the suspending means comprises an overarm extending generally parallel with and spaced from the work surface.

14. The multi-purpose support recited in claim 13 wherein the suspending means comprise a rod attached at one end to the overarm and extending generally concentric with the opening and the router bit, with the safety shield removably attached at an end of the rod opposite to the one end.

15. The multi-purpose support recited in claim 14 further comprising means for changing the dimension between the work surface and the overarm.

16. The multi-purpose support recited in claim 15 wherein the dimension changing means comprises:
    a mounting plate movably fixed alongside the support member and having a hole therein dimensioned to receive the router bit so as to extend generally parallel with the work surface;
    means for mounting the router to the mounting plate;
    means for mounting the overarm at one extremity of the mounting plate which is spaced from the work surface; and wherein the support and mounting plates permit the facile support of the router bit either with the bit parallel with the work surface for joint making activities., or with the router bit vertical to the work surface for routing activities,, and with the rod providing a pin routing capability.

17. A support for a router having a router bit, comprising:

a support member having a work surface;

means for holding the router alongside the support member with the cutting tool extending generally parallel across the work surface, comprising, a mounting plate having outside and inside surfaces with a hole extending between the outside and inside surfaces and dimensioned to receive the router bit; and means for releasably supporting the router along the outside surface with the router bit extending through the hole and generally parallel with the work surface; and means below the level of the work surface for raising and lowering the holding means together with the router relative to the work surface, comprising, a brace member fixed with the support below and generally parallel with the work surface, the brace member having a vertically threaded aperture for receiving the threaded shaft generally vertically, with the upper end of the threaded shaft bearing against the holding means for effectuating the desired raising and lowering of the mounting plate together with the router.

* * * * *